(No Model.)

J. SPECHT & I. ARMAND.
PLANTER.

No. 527,816.    Patented Oct. 23, 1894.

Witnesses
J. W. Reynolds
Chas. S. Hyer

Inventor
John Specht.
Isaiah Armand.
By John Wedderburn
Attorney

UNITED STATES PATENT OFFICE.

JOHN SPECHT AND ISAIAH ARMAND, OF GAZA, IOWA.

PLANTER.

SPECIFICATION forming part of Letters Patent No. 527,816, dated October 23, 1894.

Application filed March 29, 1894. Serial No. 505,619. (No model.)

*To all whom it may concern:*

Be it known that we, JOHN SPECHT and ISAIAH ARMAND, citizens of the United States, and residents of Gaza, in the county of O'Brien and State of Iowa, have invented certain new and useful Improvements in Planters; and we do hereby declare the following to be a full, clear, and exact description of the invention, such as will enable others skilled in the art to which it appertains to make and use the same.

This invention relates to planters designed to sow the seed in checks and is principally constructed for such grain as corn which is planted in rows at regular intervals apart.

The primary object of the invention, is the provision of a seed slide actuating mechanism which is adjustable in its parts so as to be readily applied to planters now in use without requiring a specially organized implement.

The improvement consists of the novel features and the peculiar construction and combination of the parts which hereinafter will be more fully described and claimed, and which are shown in the annexed drawings, in which—

Figure 1:
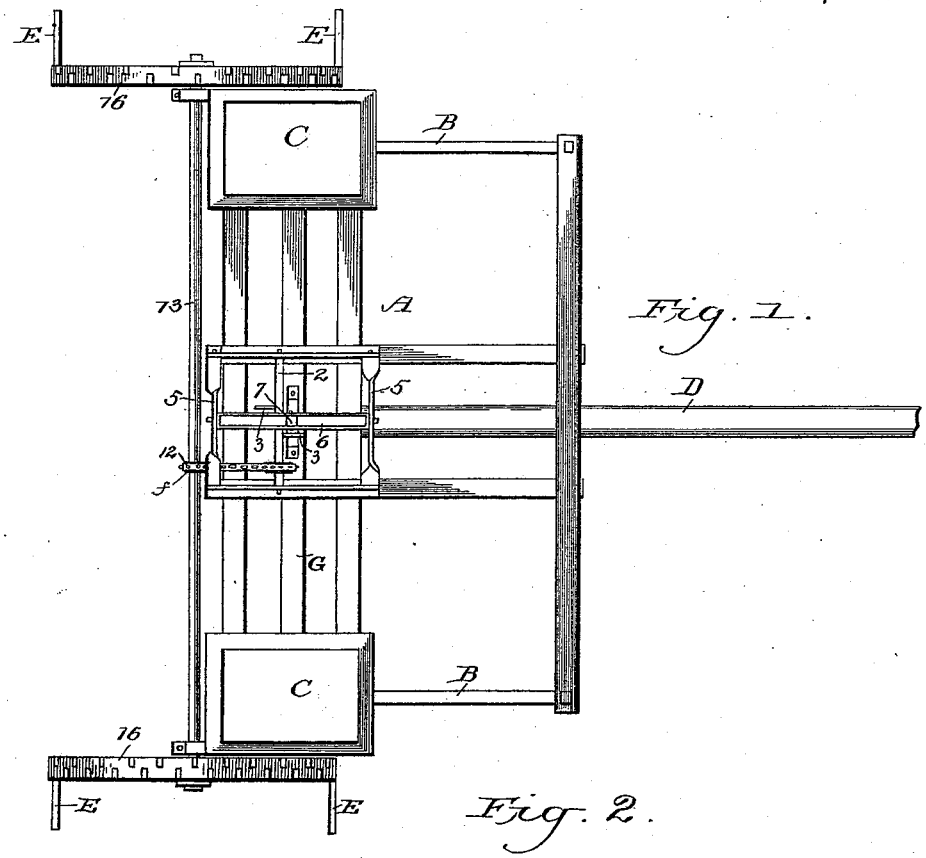
Figure 2:
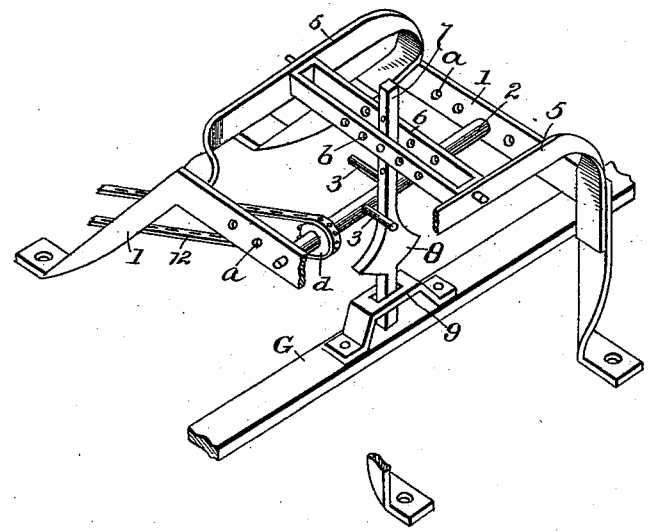

Figure 1 is a top plan view of a machine embodying the invention. Fig. 2, is a detail perspective view of the planter actuating mechanism.

In the drawings, the letter A, indicates a frame of ordinary construction in this class of machine, and is provided with runners B, seed boxes or hoppers C, and a pole or tongue D, all of usual and well known construction and arrangement. A shaft 13 is suitably journaled in bearings provided on the frame, and has ground wheels 16 at its ends provided with markers E, the latter consisting of short arms or blocks projecting laterally from the side of the ground wheels 16.

Rising from the frame A, are two pairs of arch shaped brackets 5, 5, and 1, 1 which are oppositely disposed, the brackets 5, 5, being arranged at right angles to and opposite the space between the brackets 1, 1. The horizontal portions of the brackets 1, 1 are provided with a series of openings a, which receive the journals of a short shaft 2, arranged parallel with the shaft 13. A rocker bar 6 is journaled at its ends in openings provided in the brackets 5, 5, and has a series of openings b in its length through which the upper end of a lever 7 extends, and obtains a support and vibrating center. The shaft 2, has a sprocket wheel d, and oppositely disposed tappet arms 3. The shaft 13, is provided with a sprocket wheel f, similar to the sprocket wheel d, and a sprocket chain 12, passing around the sprocket wheels d and f, transmits motion from the said shaft 13 to the shaft 2. The lever 7, is provided with a widened lower portion to form opposite tappet engaging surfaces as at 8, and said lever also has its lower end passed through a slot in a keeper 9 secured to the seed slide G. This lever 7, is arranged to have its lower end come opposite the space between the tappet arms 3, the tappet engaging surfaces 8, and the tappet arms 3 being of such relative proportions that in the rotation of the shaft 2, the tappet arms 3 will alternately engage with the opposite edges or sides of the tappet block and vibrate the said lever 7, and reciprocate the seed slide G in the well known manner to drop the grain at the required point.

The purpose of the shaft 13, and the ground wheels 16 is to actuate the planting mechanism in the manner herein described, and the markers E indicate the position of the hills in which the seed is deposited, thereby making it known when the implement is planting out of line.

The operation of the machine is as follows:—On drawing the device over the field, the wheel 16 will engage with the ground and impart a rotary movement to the shaft 13 and through the sprocket wheels d and f and the sprocket chain 12 will cause a corresponding rotary movement of the shaft 2, and by means of the tappet arms 3 and the lever 7 carrying the tappet block 8, will cause a reciprocatory movement of the seed slide G and plant the grain in the usual manner.

Having thus described the invention, what is claimed as new is—

1. In a planter the combination with the seed dropping mechanism and seed slide, of arch shaped brackets arranged parallel and provided with a series of openings, a rotary shaft having its ends bearing in aligned openings of said series and provided with tappet arms extending in opposite directions therefrom, and a vertical lever provided with tappet engaging surfaces which are adapted to be engaged by the said tappet arms to impart a reciprocating movement to the said slide substantially as and for the purposes specified.

2. In a planter the combination with the seed boxes and seed slide, of a rocker bar provided with a series of openings in its length, a lever adapted to have its upper end adjustably attached to said rocker bar and its lower end in engagement with the said seed slide, said lever having tappet engaging surfaces thereon and a rotary shaft having tappet arms adapted to engage the said tappet on the lever, substantially as and for the purposes specified.

3. In a planter, the combination with the seed slide, of a lever having its lower end in engagement with said seed slide and provided with tappet engaging surfaces, a pair of brackets having a series of openings, a rotary shaft adjustably mounted in the said brackets and provided with tappet arms which engage the tappet surfaces of the said lever, and a rocker bar arranged at right angles to the said shaft and provided with a series of openings in its length for adjustable attachment of the said lever, substantially as and for the purposes specified.

In testimony whereof we have signed this specification in the presence of two subscribing witnesses.

JOHN SPECHT.
ISAIAH ARMAND.

Witnesses:
I. H. HOEPNER,
S. A. MARTIN.